United States Patent
Hanaoka et al.

(10) Patent No.: US 6,552,766 B2
(45) Date of Patent: Apr. 22, 2003

(54) REFLECTION LIQUID CRYSTAL DISPLAY DEVICE HAVING SLANTED PARTS IN INTERFACES

(75) Inventors: Kazutaka Hanaoka, Kawasaki (JP); Yuichi Inoue, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/881,614

(22) Filed: Jun. 14, 2001

(65) Prior Publication Data

US 2001/0040659 A1 Nov. 15, 2001

Related U.S. Application Data

(63) Continuation of application No. PCT/JP99/07416, filed on Dec. 28, 1999.

(30) Foreign Application Priority Data

Dec. 28, 1998 (JP) .......................................... 10-374814

(51) Int. Cl.⁷ ............................................ G02F 1/1335
(52) U.S. Cl. ...................................................... 349/113
(58) Field of Search .............................. 349/113, 201, 349/202

(56) References Cited

U.S. PATENT DOCUMENTS 5,299,037 A * 3/1994 Sakata ........................ 349/201
5,299,289 A * 3/1994 Omae et al. ................. 349/201
5,949,503 A * 9/1999 Koyama et al. ............... 349/41
6,014,197 A * 1/2000 Hikmet ........................ 349/201

FOREIGN PATENT DOCUMENTS

| JP | 8-248414 | 9/1996 |
|---|---|---|
| JP | 9-15550 | 1/1997 |
| JP | 9-244023 | 9/1997 |
| JP | 9-329784 | 12/1997 |
| JP | 10-111509 | 4/1998 |
| JP | 11-6999 | 1/1999 |

* cited by examiner

*Primary Examiner*—Kenneth Parker
(74) *Attorney, Agent, or Firm*—Greer, Burns & Crain Ltd.

(57) ABSTRACT

A reflection liquid crystal display device includes: a liquid crystal layer; a transparent insulating layer provided in an optical path of a light incident on the liquid crystal layer, the transparent insulating layer having a refractive index substantially equal to one of refractive indexes for ordinary ray and for extraordinary ray of the liquid crystal layer; a reflector for reflecting the light passing through the liquid crystal layer and the transparent insulating layer; and first and second substrates provided on first and second sides of an optical member so as to oppose each other, the optical member being formed of the liquid crystal layer, the transparent insulating layer, and the reflector, wherein an interface formed between the liquid crystal layer and the transparent insulating layer has a plurality of slant parts of substantially the same shape, the slant parts each having a predetermined inclination with respect to the reflector.

9 Claims, 18 Drawing Sheets

($\theta_x = 30°$  $n_d = n_e = 1.7$  $n_o = 1.45$  V=0 )

($\theta_x = 30°$  $n_d = n_e = 1.7$  $n_o = 1.45$  V≠0 )

REFLECTION LIQUID CRYSTAL DISPLAY DEVICE HAVING SLANTED PARTS IN INTERFACES

This is a continuation of PCT/JP99/07416, filed Dec. 28, 1999.

TECHNICAL FIELD

The present invention generally relates to reflection liquid crystal display devices, and more particularly to a reflection liquid crystal display device that dispenses with a polarizer.

Recently, reflection liquid crystal display devices have been highlighted because of a demand for power-saving liquid crystal display devices. A power-saving reflection liquid crystal display device that is also downsized and lightweight can be realized by dispensing with a backlight that consumes a large amount of power.

BACKGROUND ART

Conventional reflection liquid crystal display devices are classified into the following types: those with two polarizers, those with a single polarizer, and those with no polarizer.

Generally, a two-polarizer reflection liquid crystal display device is defined by a liquid crystal display panel having a liquid crystal, electrodes, and substrates all sandwiched between first and second polarizers, and a reflector provided outside the liquid crystal display panel. A light incident on the first polarizer without the reflector passes through the substrates and a liquid crystal layer to be reflected back from the reflector. The reflected light again passes through the substrates and the liquid crystal layer to be emitted out from the reflection liquid crystal display device through the first polarizer without the reflector. In this case, the incident light passes through each of the first and second polarizers twice. Therefore, the light incident on the reflection liquid crystal display device passes through the first and second polarizers four times in total before being emitted out from the reflection liquid crystal display device.

A single-polarizer reflection liquid crystal display device has the polarizer on the side of a light source, and a reflector sandwiched between a first substrate and a liquid crystal layer. A light incident on the polarizer passes through a second substrate and the liquid crystal layer to be reflected back from the reflector. The reflected light again passes through the liquid crystal layer and the second substrate to be emitted out from the reflection liquid crystal display device through the polarizer. In this case, the incident light passes through the polarizer twice.

A conventional no-polarizer reflection liquid crystal display device includes a guest-host liquid crystal in which a liquid crystal is mixed with a dichroic dye. Some of liquid crystal panels employing a guest-host liquid crystal have two layers of guest-host liquid crystals in mutually perpendicular orientations, and others have a guest-host liquid crystal disposed in a spiral state.

However, the two-polarizer reflection liquid crystal display device has a very low reflectivity with respect to the incident light, and accordingly, a very low liquid crystal display brightness since the incident light passes through the first and second polarizers four times in total before being emitted out from the reflection liquid crystal display device. Further, the two-polarizer reflection liquid crystal display device has the second polarizer and one of the substrates sandwiched by the liquid crystal layer and the reflector, so that the liquid crystal layer and the reflector are separated by the width of the one of the substrate. Therefore, liquid crystal display may be doubled in the two-polarizer reflection liquid crystal display device.

The single-polarizer reflection liquid crystal display device has the incident light pass through the polarizer twice. Therefore, the single-polarizer reflection liquid crystal display device has a reflectivity with respect to the incident light higher than that of the two-polarizer reflection liquid crystal display device having the incident light pass through the first and second polarizers four times in total. However, the single-polarizer reflection liquid crystal display device is required to include a ¼ plate to control the ON-OFF switching of liquid crystal display. This ¼ plate disperses the wavelength of the incident light, which makes it difficult for the single-polarizer reflection liquid crystal display device to perform a high-contrast liquid crystal display.

The no-polarizer reflection liquid crystal display device has a reflectivity with respect to the incident light higher than that of the single-polarizer reflection liquid crystal display device. However, in a reflection liquid crystal display device having two layers of guest-host liquid crystals in mutually perpendicular orientations, the two layers of the liquid crystals should be activated simultaneously. Therefore, this reflection liquid crystal display device has difficulty in controllability. On the other hand, in a reflection liquid crystal display device having a guest-host liquid crystal disposed in a spiral state, it is necessary to apply a high voltage to turn on a liquid crystal in a vertical position, while an incident light is scattered in a weakly turned-on part of the liquid crystal. Therefore, it is difficult for this reflection liquid crystal display device to perform a high-contrast liquid crystal display.

DISCLOSURE OF THE INVENTION

It is a general object of the present invention to provide a novel and useful reflection liquid crystal display device in which the above-described disadvantages are eliminated.

A more specific object of the present invention is to provide a reflection liquid crystal display device that obtains high brightness and high contrast without employing a polarizer.

It is yet another object of the present invention to provide a reflection liquid crystal display device including:

a liquid crystal layer;

a transparent insulating layer provided in an optical path of a light incident on the liquid crystal layer, the transparent insulating layer having a refractive index substantially equal to one of refractive indexes for ordinary ray and for extraordinary ray of the liquid crystal layer;

a reflector for reflecting the light passing through the liquid crystal layer and the transparent insulating layer; and first and second substrates provided on first and second sides of an optical member so as to oppose each other, the optical member being formed of the liquid crystal layer, the transparent insulating layer, and the reflector, wherein an interface formed between the liquid crystal layer and the transparent insulating layer has a plurality of slant parts of substantially the same shape, the slant parts each having a predetermined inclination with respect to the reflector.

According to the present invention, if the refractive index of the transparent insulating layer is substantially equal to that of the liquid crystal layer, a light incident on the reflection liquid crystal display device along an incident optical path vertical thereto is emitted out to travel in the reverse direction in an emission optical path substantially equal to the incident optical path. On the other hand, if the refractive index of the transparent insulating layer is not equal to that of the liquid crystal layer, a light incident on the reflection liquid crystal display device along an incident optical path vertical thereto is emitted out along an emission optical path different from the incident optical path. Therefore, unlike a conventional liquid crystal display device, the reflection liquid crystal display device of the present invention is allowed to optically modulate an incident light without using a polarizer, and accordingly, to perform a high-brightness display of a high contrast ratio. Further, since the reflection liquid crystal display device of the present invention has high brightness, the reflection liquid crystal display device can be used also as a projection liquid crystal display.

Other objects, features and advantages of the present invention will become more apparent from the following detailed description of preferred embodiments of the present invention when read in conjunction with the accompanying drawings.

BEST MODE FOR CARRYING OUT THE INVENTION

[Principle]

First, a description will be given of the principle of the present invention.

Figure 1:
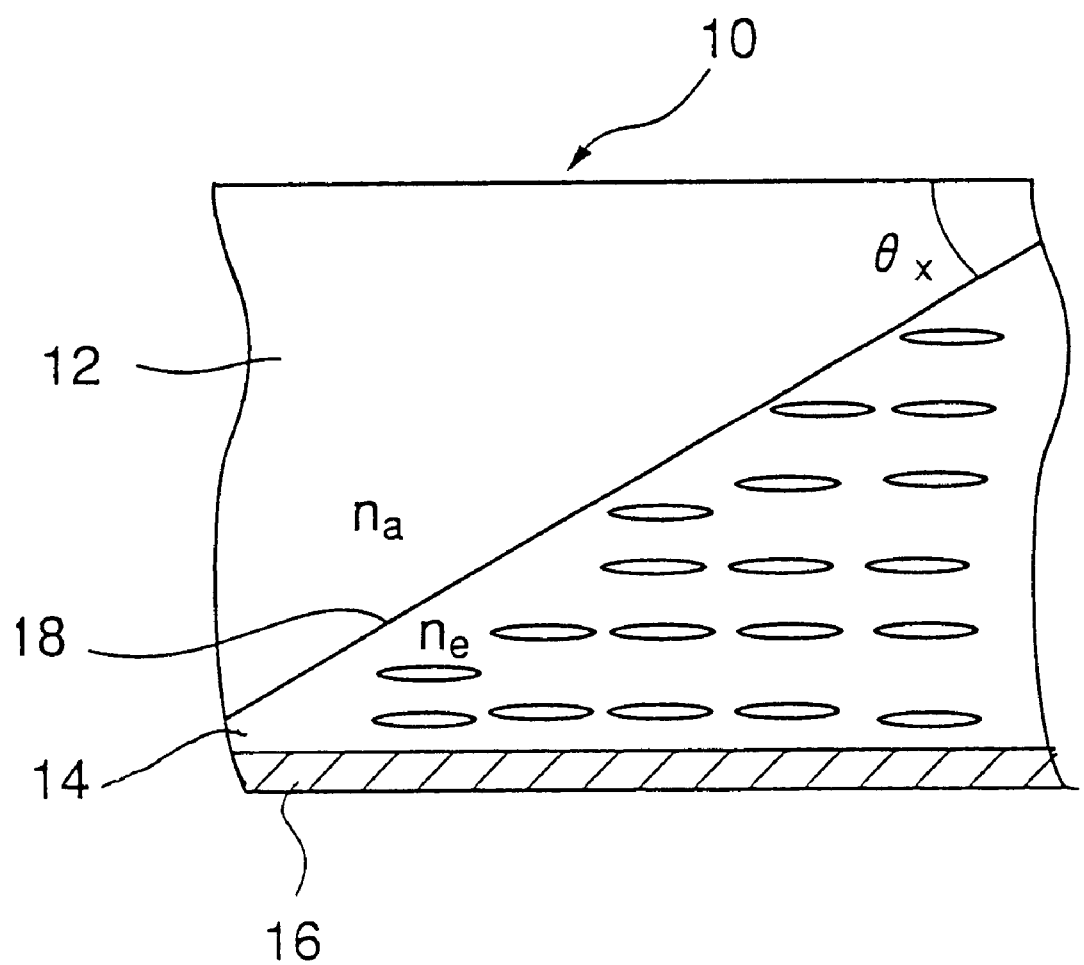
FIG. 1 is a sectional view showing a principle of a reflection liquid crystal display device of the present invention.

FIG. 1 is a sectional view of a reflection liquid crystal display device (hereinafter referred to as a liquid crystal display device) 10 of the present invention.

As shown in FIG. 1, the liquid crystal display device 10 includes a resin layer 12, a liquid crystal layer 14, and a reflector 16. The resin layer 12 is made of acrylic, for instance. An interface 18 formed between the resin layer 12 and the liquid crystal layer 14 has an inclination of θ x with respect to the surface of the liquid crystal display device 10 and the reflector 16. The resin layer 12 has a refractive index of $n_a$, the liquid crystal layer 14 has a refractive index for ordinary lay of $n_o$ and a refractive index for extraordinary lay of $n_e$.

Figure 2:
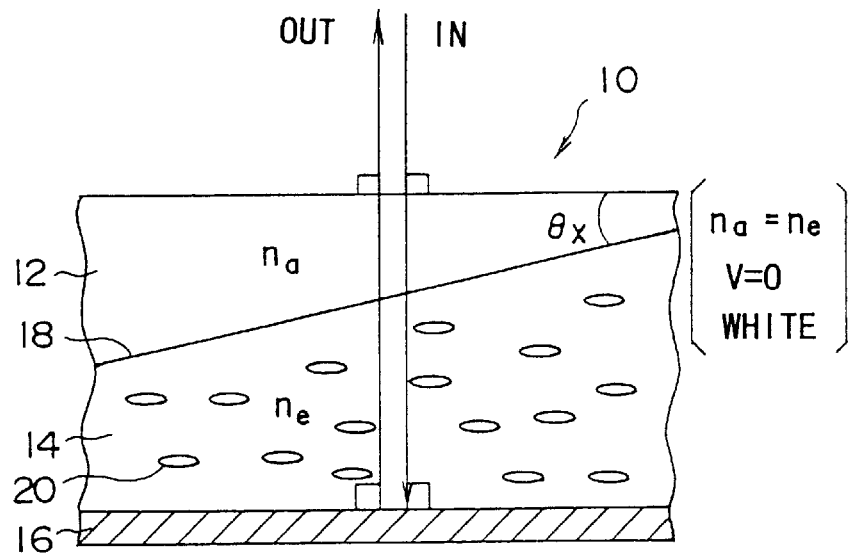
FIG. 2 is a diagram showing reflection of an incident light in the reflection liquid crystal display device at a time when no voltage is applied to a liquid crystal layer.
Figure 3:
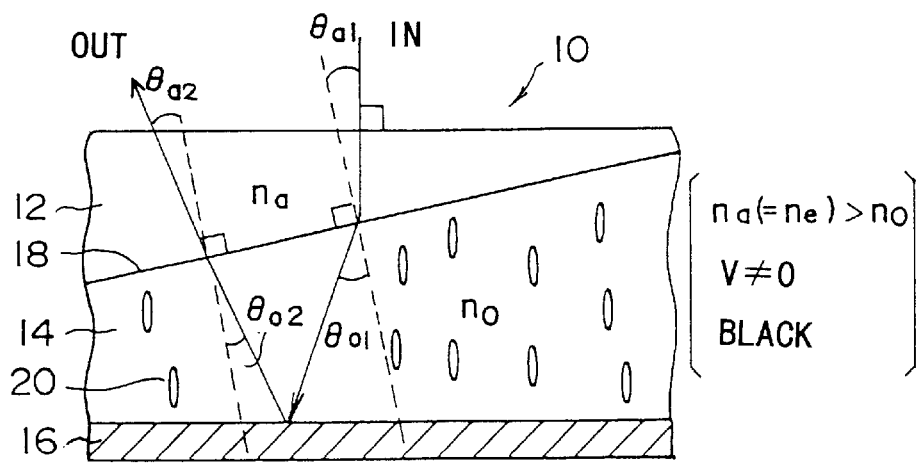
FIG. 3 is a diagram showing reflection of an incident light in the reflection liquid crystal display device at a time when a voltage is applied to the liquid crystal layer.

Each of FIGS. 2 and 3 is a diagram showing a reflected state of an incident light in the liquid crystal display device 10 in which types of the resin layer 12 and the liquid crystal layer 14 are selected so as to satisfy conditions $n_a=n_e$ and $n_a>n_o$. FIG. 2 shows the reflected state of the incident light at a time when no voltage is applied to the liquid crystal layer 14, and FIG. 3 shows the reflected state of the incident light at a time when a voltage is applied to the liquid crystal layer 14.

As shown in FIG. 2, when no voltage is applied to the liquid crystal layer 14, the long axes of liquid crystal molecules 20 forming the liquid crystal layer 14 are aligned parallel to the surface of the liquid crystal display device 10 and the reflector 16. At this point, the liquid crystal layer 14 has the refractive index of $n_e$. Since $n_a=n_e$, the light vertically incident on the surface of the liquid crystal display device 10 passes straight through the resin layer 12 and the liquid crystal layer 14 to reach the reflector 16. Then, the incident light is reflected back from the reflector 16 to again pass through the liquid crystal layer 14 and the resin layer 12, and thereafter, is emitted out vertically from the surface of the liquid crystal display device 10. Thus, the light is emitted in the same direction from which the light is made incident. Therefore, when no voltage is applied to the liquid crystal layer 14, the liquid crystal display device 10 including the resin layer 12 and the liquid crystal layer 14 in the $n_a=n_e$ relation performs white-mode display.

On the other hand, as shown in FIG. 3, when the voltage is applied to the liquid crystal layer 14, the long axes of the liquid crystal molecules 20 forming the liquid crystal layer 14 are aligned vertically to the surface of the liquid crystal display device 10 and the reflector 16. At this point, the liquid crystal layer 14 has the refractive index of $n_o$. Since $n_a>n_o$, the light vertically incident on the surface of the liquid crystal display device 10 is made incident on the interface 18 formed between the resin layer 12 and the liquid crystal layer 14 at an incident angle of $\theta_{a1}$ and is refracted at a refractive angle of $\theta_{o1}$ ($>\theta_{a1}$). The incident light is reflected from the reflector 16. The reflected light is made incident on the interface 18 at an incident angle of $\theta_{o2}$ and is refracted at a refractive angle of $\theta_{a2}$ ($<\theta_{o2}$). Thereafter, the reflected light is emitted out from the liquid crystal display device 10. Thus, the light is emitted in a direction totally different from that from which the light is made incident. Therefore, when no voltage is applied to the liquid crystal layer 14, the liquid crystal display device 10 including the resin layer 12 and the liquid crystal layer 14 in the $n_a>n_o$ relation performs black-mode display. At this time, the larger a difference between the refractive indexes $n_a$ and $n_o$, the higher a display contrast.

Figure 4:
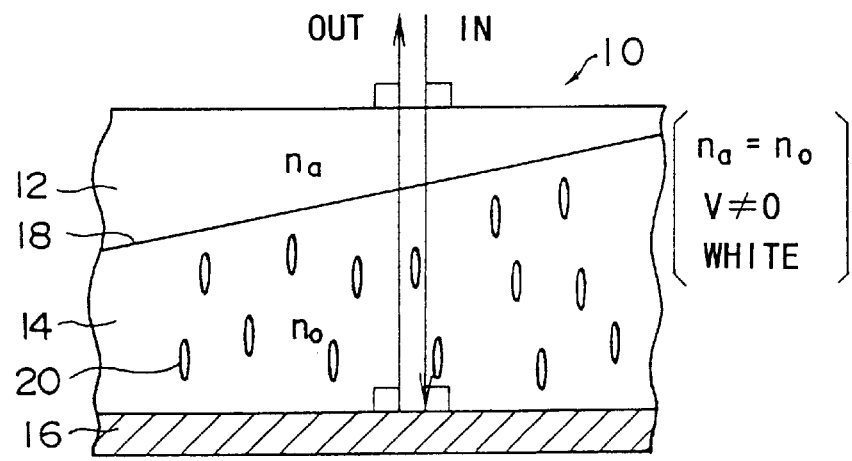
FIG. 4 is a diagram showing reflection of an incident light in the reflection liquid crystal display device at a time when a voltage is applied to the liquid crystal layer.
Figure 5:
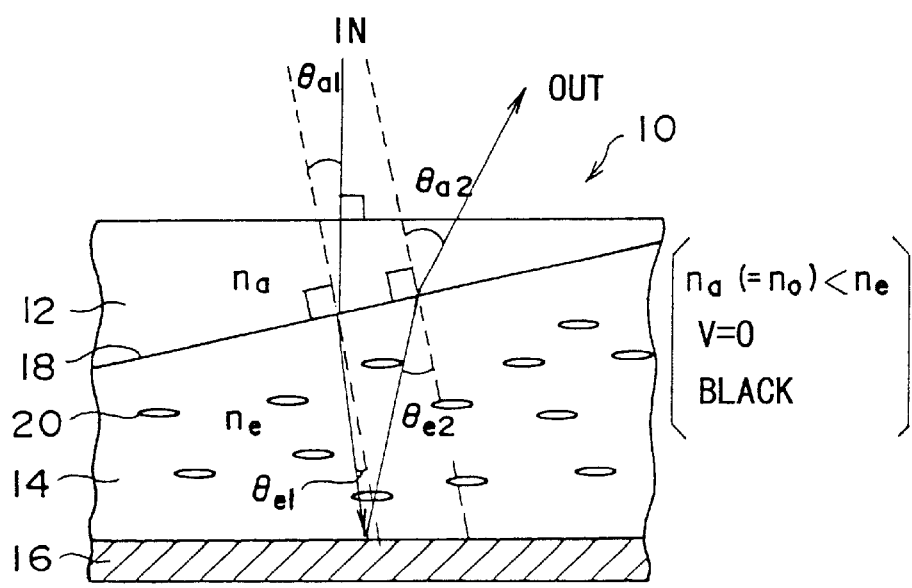
FIG. 5 is a diagram showing reflection of an incident light in the reflection liquid crystal display device at a time when no voltage is applied to the liquid crystal layer.

Each of FIGS. 4 and 5 is a diagram showing a reflected state of an incident light in the liquid crystal display device 10 in which types of the resin layer 12 and the liquid crystal layer 14 are selected so as to satisfy conditions $n_a=n_o$ and $n_a<n_e$. FIG. 4 shows the reflected state of the incident light at a time when a voltage is applied to the liquid crystal layer 14, and FIG. 5 shows the reflected state of the incident light at a time when no voltage is applied to the liquid crystal layer 14.

As shown in FIG. 4, when the voltage is applied to the liquid crystal layer 14, the long axes of the liquid crystal molecules 20 forming the liquid crystal layer 14 are aligned vertical to the surface of the liquid crystal display device 10 and the reflector 16. At this point, the liquid crystal layer 14 has the refractive index of $n_o$. Since $n_a=n_o$, the light vertically incident on the surface of the liquid crystal display device 10 passes straight through the resin layer 12 and the liquid crystal layer 14 to reach the reflector 16. Then, the incident light is reflected back from the reflector 16 to again pass through the liquid crystal layer 14 and the resin layer 12, and thereafter, is emitted out vertically from the surface of the liquid crystal display device 10. Thus, the light is emitted in the same direction from which the light is made incident. Therefore, when the voltage is applied to the liquid crystal layer 14, the liquid crystal display device 10 including the resin layer 12 and the liquid crystal layer 14 in the $n_a=n_o$ relation performs white-mode display.

On the other hand, as shown in FIG. 5, when no voltage is applied to the liquid crystal layer 14, the long axes of the liquid crystal molecules 20 forming the liquid crystal layer 14 are aligned parallel to the surface of the liquid crystal display device 10 and the reflector 16. At this point, the liquid crystal layer 14 has the refractive index of $n_e$. Since $n_a<n_e$, the light vertically incident on the surface of the liquid crystal display device 10 is made incident on the interface 18 formed between the resin layer 12 and the liquid crystal layer 14 at an incident angle of $\theta_{a1}$ and is refracted at a refractive angle of $\theta_{e1}$ ($<\theta_{a1}$). The incident light is reflected from the reflector 16. The reflected light is made incident on the interface 18 at an incident angle of $\theta_{e2}$ and is refracted at a refractive angle of $\theta_{a2}$ ($>\theta_{e2}$) Thereafter, the reflected light is emitted out from the liquid crystal display device 10. Thus, the light is emitted in a direction totally different from that from which the light is made incident. Therefore, when no voltage is applied to the liquid crystal layer 14, the liquid crystal display device 10 including the resin layer 12 and the liquid crystal layer 14 in the $n_a<n_e$ relation performs black-mode display. At this time, the larger a difference between the refractive indexes $n_a$ and $n_e$, the higher a display contrast.

As described above, the light is emitted in the same direction from which the light is made incident when the liquid crystal display device 10 performs the white-mode display, and the light is emitted in a direction totally different from that from which the light is made incident when the liquid crystal display device 10 performs the black-mode display. Therefore, the liquid crystal display device 10 can perform a high-contrast display. Further, since the liquid crystal display device 10 without a polarizer has a high reflectivity with respect to an incident light, the liquid crystal display device 10 can perform a high-brightness display. Furthermore, since the liquid crystal display device 10 employs no polarizer, the liquid crystal display device 10 can be downsized and lighter in weight, and the production costs thereof can be lowered.

If the panel area of the liquid crystal display device 10 is to be widened, the interface 18 formed between the resin layer 12 and the liquid crystal layer 14 has to include a plurality of slant parts. In the case of forming the interface 18 of the slant parts, the liquid crystal display device 10, for instance, may have a below-described structure.

Figure 6:
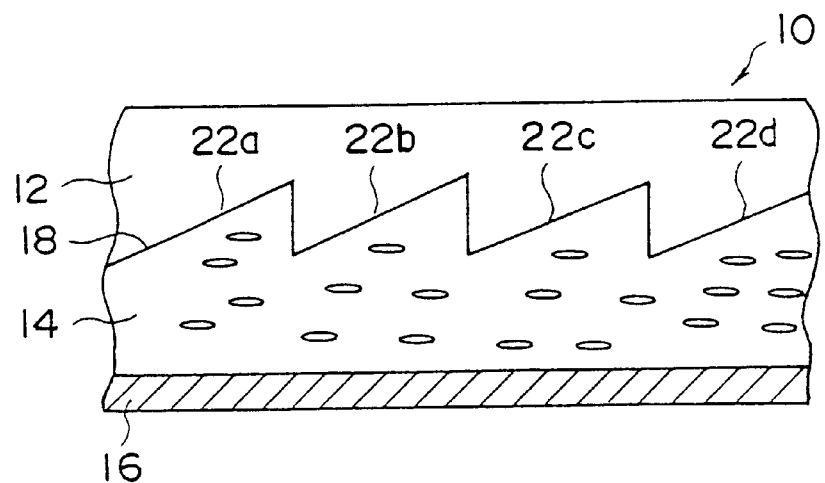
FIG. 6 is a sectional view showing a structure of the reflection liquid crystal display device including a plurality of slant parts.
Figure 7:
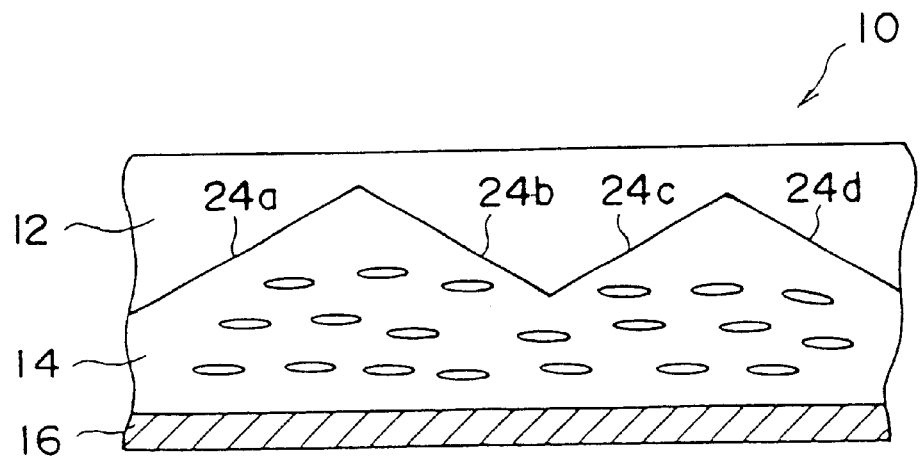
FIG. 7 a sectional view showing a structure of the reflection liquid crystal display device including a plurality of slant parts.

FIGS. 6 and 7 are sectional views of the liquid crystal display device 10 including a plurality of slant parts. FIG. 6 shows a case in which the slant parts are formed like saw teeth, and FIG. 7 shows a case in which the slant parts are formed like peaks and valleys. In FIG. 6, slant parts 22a, 22b, 22c, and 22d have the same inclination and pitch. In FIG. 7, slant parts 24a and 24c have the same inclination, slant parts 24b and 24d has the same inclination, and the slant parts 24a through 24d has the same pitch. The number of the slant parts included in the liquid crystal display device 10 is not limited to four.

Figure 8:
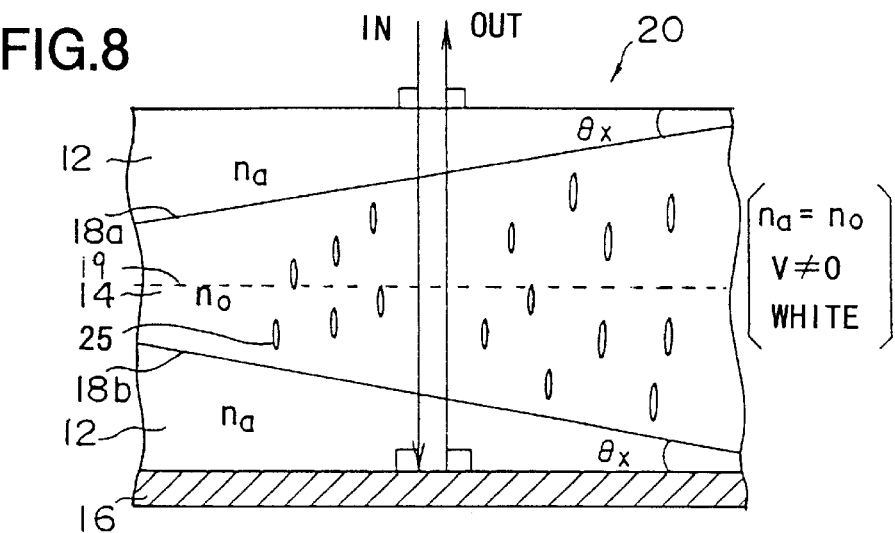
FIG. 8 is a diagram showing reflection of an incident light in a reflection liquid crystal display device of the present invention including two resin layers at a time when a voltage is applied to the liquid crystal layer.
Figure 9:
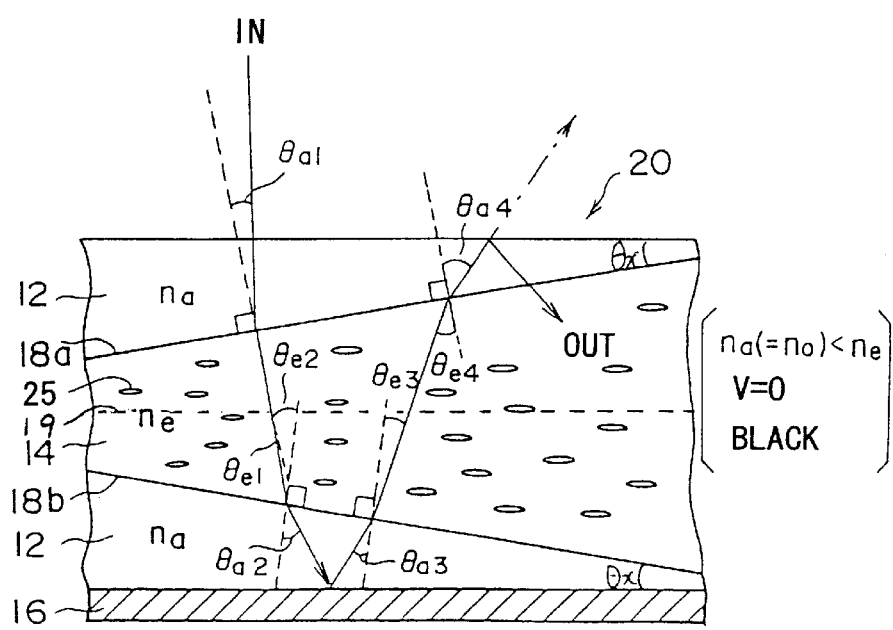
FIG. 9 is a diagram showing reflection of an incident light in the reflection liquid crystal display device including the two resin layers at a time when no voltage is applied to the liquid crystal layer.

Each of FIGS. 8 and 9 is a diagram showing a reflected state of an incident light in a liquid crystal display device 20 in which types of the resin layers 12 and the liquid crystal layer 14 are selected so as to satisfy conditions $n_a=n_o$ and $n_a<n_e$. The liquid crystal display device 20 includes the resin layers 12 on and under the liquid crystal layer 14 including liquid crystal molecules 25. In the liquid crystal display device 20, interfaces 18a and 18b are formed symmetrically with respect to a centerline 19 of the liquid crystal layer 14 parallel to the reflector 16, and each have an inclination θx.

FIG. 8 shows the reflected state of the incident light at a time when a voltage is applied to the liquid crystal layer 14, and FIG. 9 shows the reflected state of the incident light at a time when no voltage is applied to the liquid crystal layer 14.

As shown in FIG. 8, when the voltage is applied to the liquid crystal layer 14, the long axes of the liquid crystal molecules 25 forming the liquid crystal layer 14 are aligned vertically to the surface of the liquid crystal display device 20 and the reflector 16. At this point, the liquid crystal layer 14 has the refractive index of $n_o$. Since $n_a=n_o$, the light vertically incident on the surface of the liquid crystal display device 20 passes straight through the two resin layers 12 and the liquid crystal layer 14 to reach the reflector 16. Then, the incident light is reflected back from the reflector 16 to again pass through the liquid crystal layer 14 and the two resin layers 12, and thereafter, is emitted out vertically from the surface of the liquid crystal display device 20. Thus, the light is emitted in the same direction from which the light is made incident. Therefore, when the voltage is applied to the liquid crystal layer 14, the liquid crystal display device 20 including the resin layers 12 and the liquid crystal layer 14 in the $n_a=n_o$ relation performs white-mode display.

On the other hand, as shown in FIG. 9, when no voltage is applied to the liquid crystal layer 14, the long axes of the liquid crystal molecules 25 forming the liquid crystal layer 14 are aligned parallel to the surface of the liquid crystal display device 20 and the reflector 16. At this point, the liquid crystal layer 14 has the refractive index of $n_e$. Since $n_a<n_e$, the light vertically incident on the surface of the liquid crystal display device 20 is made incident on the interface 18a at an incident angle of $\theta_{a1}$ and is refracted at a refractive angle of $\theta_{e1}$ ($<\theta_{a1}$). Further, the incident light is made incident on the interface 18b at an incident angle of $\theta_{e2}$ and is refracted at a refractive angle of $\theta_{a2}$ ($>\theta_{e2}$). Then, the incident light is reflected from the reflector 16. The reflected light is made incident on the interface 18b at an incident angle of $\theta_{a3}$ and is refracted at a refractive angle of $\theta_{e3}$ ($<74_{a3}$). Further, the reflected light is made incident on the interface 18a at an incident angle of $\theta_{e4}$ and is refracted at a refractive angle of $\theta_{a4}$ ($>\theta_{e4}$). Thereafter, the reflected light is emitted out from the liquid crystal display device 20.

Thus, the light is emitted in a direction totally different from that from which the light is made incident. Therefore, when no voltage is applied to the liquid crystal layer 14, the liquid crystal display device 20 including the resin layers 12 and the liquid crystal layer 14 in the $n_a<n_e$ relation performs black-mode display. At this time, the larger a difference between the refractive indexes $n_a$ and $n_e$, the higher a display contrast.

Here, a light may not be emitted out from the liquid crystal display device 20 depending on values of the inclinations θx of the interfaces 18a and 18b or values of the refractive indexes $n_a$ and $n_e$. In this case, black-mode display of higher quality is performed. Further, by selecting the resin layers 12 and the liquid crystal later 14 that satisfy the condition $n_a=n_e$, the liquid crystal display device 20 shown in FIGS. 8 and 9 is also allowed to perform the white-mode display when no voltage is applied to the liquid crystal layer 14 and the black-mode display when a voltage is applied to the liquid crystal layer 14.

As described above, the light is emitted in the same direction from which the light is made incident when the liquid crystal display device 20 performs the white-mode display, and the light is emitted in a direction totally different from that from which the light is made incident when the liquid crystal display device 20 performs the black-mode display. Therefore, the liquid crystal display device 20 can perform a high-contrast display. Further, since the liquid crystal display device 20 without a polarizer has a high reflectivity with respect to an incident light, the liquid crystal display device 20 can perform a high-brightness display. Furthermore, since the liquid crystal display device 20 employs no polarizer, the liquid crystal display device 20 can be downsized and lighter in weight, and the production costs thereof can be lowered. Since the liquid crystal display device 20 includes the two interfaces 18a and 18b, the liquid crystal display device 20 has a greater angular difference between the directions of emitted and incident lights in the black-mode display than the liquid crystal display device 10. This allows the liquid crystal display device 20 to perform a higher-contrast display.

If the panel area of the liquid crystal display device 20 is to be widened, the interfaces 18a and 18b formed between the resin layers 12 and the liquid crystal layer 14 have to include a plurality of slant parts. In the case of forming the interfaces 18a and 18b of the slant parts, the liquid crystal display device 20, for instance, may have a below-described structure.

Figure 10:
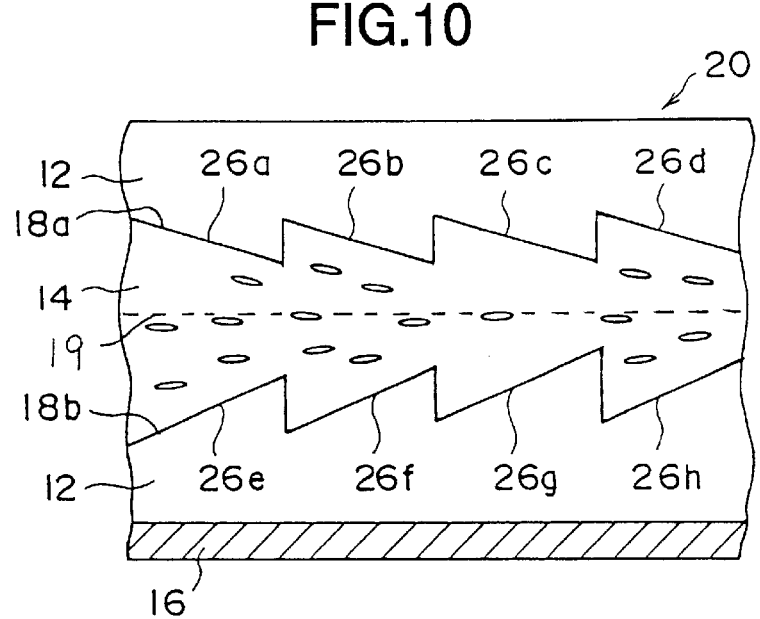
FIG. 10 is a sectional view showing a structure of the reflection liquid crystal display device including the two resin layers in which device a plurality of slant parts are formed.
Figure 11:
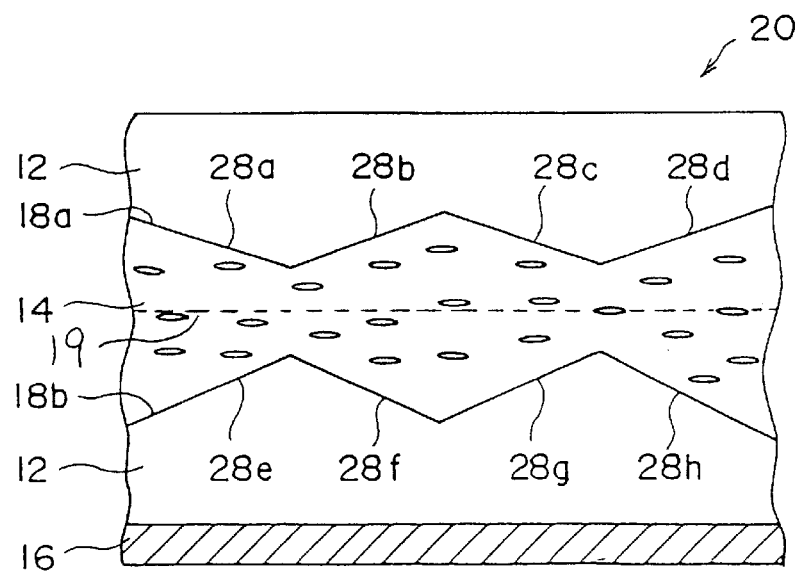
FIG. 11 is a sectional view showing a structure of the reflection liquid crystal display device including the two resin layers in which device a plurality of slant parts are formed.

FIGS. 10 and 11 are sectional views of the liquid crystal display device 20 including a plurality of slant parts. FIG. 10 shows a case in which the slant parts are formed like saw teeth, and FIG. 11 shows a case in which the slant parts are formed like peaks and valleys. In FIG. 10, slant parts 26a, 26b, 26c, and 26d are formed symmetrically with slant parts 26e, 26f, 26g, and 26h with respect to a centerline 19 of the liquid crystal layer 14 parallel to the reflector 16, respectively. The slant parts 26a, 26b, 26c, and 26d have the same inclination and the slant parts 26e, 26f, 26g, and 26h have the same inclination. The slant parts 26a through 26h has the same pitch. In FIG. 11, slant parts 28a, 28b, 28c, and 28d are formed symmetrically with slant parts 28e, 28f, 28g, and 28h with respect to the centerline 19 of the liquid crystal layer 14 parallel to the reflector 16, respectively. The slant parts 28a, 28b, 28c, and 28d have the same inclination and the slant parts 28e, 28f, 28g, and 28h have the same inclination. The slant parts 28a through 28h has the same pitch. The number of the slant parts included in the liquid crystal display device 10 is not limited to eight.

Figure 12:
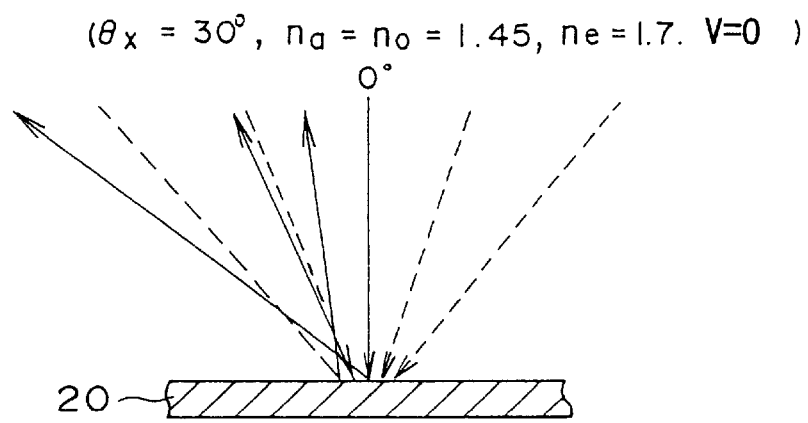
FIG. 12 is a diagram showing reflection of incident lights in the reflection liquid crystal display device of the present invention.
Figure 13:
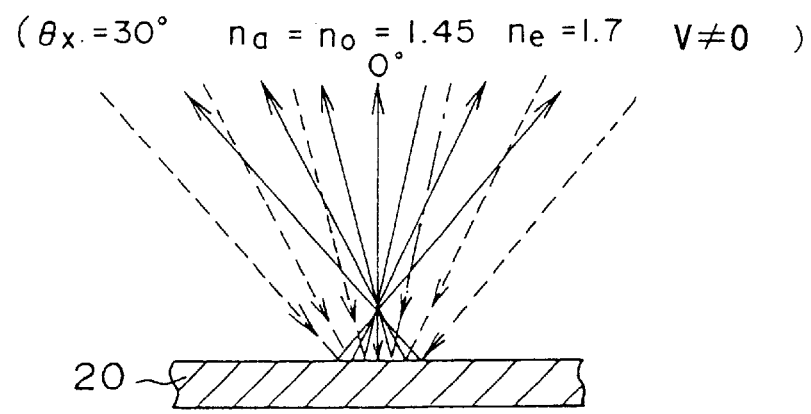
FIG. 13 is a diagram showing reflection of incident lights in the reflection liquid crystal display device of the present invention.
Figure 14:
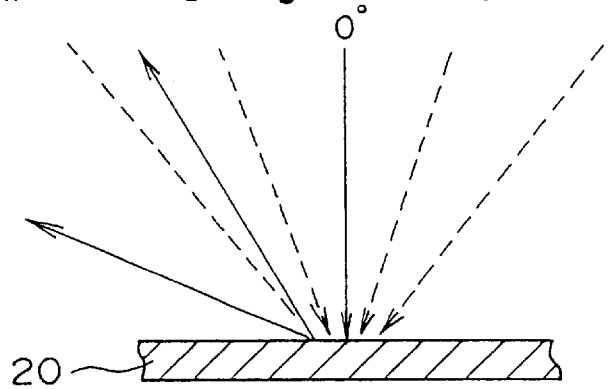
FIG. 14 is a diagram showing reflection of incident lights in the reflection liquid crystal display device of the present invention.
Figure 15:
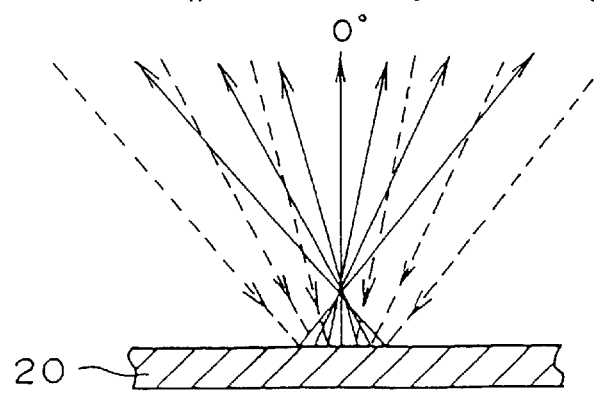
FIG. 15 is a diagram showing reflection of incident lights in the reflection liquid crystal display device of the present invention.

Each of FIGS. 12 through 15 is a diagram showing a reflected state of incident lights in the liquid crystal display device 20 in which $n_a=n_o=1.45$ and $n_e=1.7$. FIG. 12 is a diagram showing the reflected state of the incident lights in the liquid crystal display device 20 in which each of the interfaces 18a and 18b has an inclination θx satisfying θx=30° and no voltage is applied to the liquid crystal layer 14. FIG. 13 is a diagram showing the reflected state of the incident lights in the liquid crystal display device 20 in which θx=30° and a voltage is applied to the liquid crystal layer 14. FIG. 14 is a diagram showing the reflected state of the incident lights in the liquid crystal display device 20 in which θx=40° and no voltage is applied to the liquid crystal layer 14. FIG. 15 is a diagram showing the reflected state of the incident lights in the liquid crystal display device 20 in which θx=40° and a voltage is applied to the liquid crystal layer 14.

Figure 16:
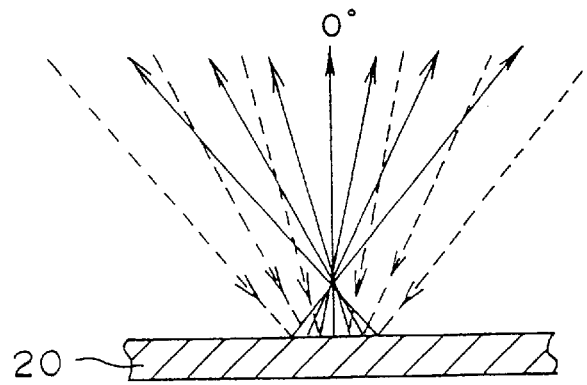
FIG. 16 is a diagram showing reflection of incident lights in the reflection liquid crystal display device of the present invention.
Figure 17:
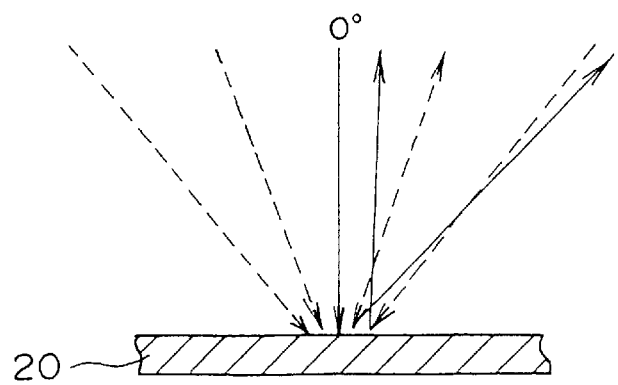
FIG. 17 is a diagram showing reflection of incident lights in the reflection liquid crystal display device of the present invention.
Figure 18:
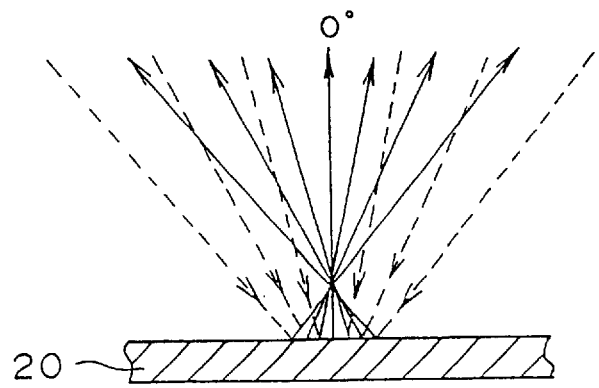
FIG. 18 is a diagram showing a reflected state of incident lights in the reflection liquid crystal display device of the present invention.
Figure 19:
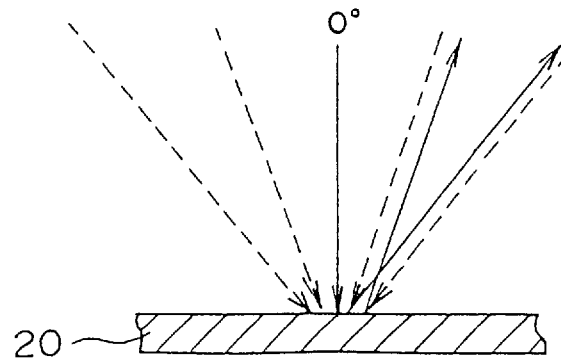
FIG. 19 is a diagram showing reflection of incident lights in the reflection liquid crystal display device of the present invention.

Each of FIGS. 16 through 19 is a diagram showing a reflected state of incident lights in the liquid crystal display device 20 in which $n_a=n_o=1.7$ and $n_e=1.45$. FIG. 16 is a diagram showing the reflected state of the incident lights in the liquid crystal display device 20 in which θx=30° and no voltage is applied to the liquid crystal layer 14. FIG. 17 is a diagram showing the reflected state of the incident lights in the liquid crystal display device 20 in which θx=30° and a voltage is applied to the liquid crystal layer 14. FIG. 18 is a diagram showing the reflected state of the incident lights in the liquid crystal display device 20 in which θx=40° and no voltage is applied to the liquid crystal layer 14. FIG. 19 is a diagram showing the reflected state of the incident lights in the liquid crystal display device 20 in which θx=40° and a voltage is applied to the liquid crystal layer 14.

As shown in FIGS. 12 through 19, when the liquid crystal layer 14 and the resin layers 12 have the different refractive indexes, the lights are refracted at the interfaces 18a and 18b. As a result, the lights are emitted in directions totally different from those from which the lights are made incident. Total reflection may occur depending on values of θx, $n_a$, $n_e$, and $n_o$ so as to prevent the lights from being emitted out from the liquid crystal display device 20. When the liquid crystal layer 14 and the resin layers 12 have the same refractive index, the lights are prevented from being refracted at the interfaces 18a and 18b. As a result, the incident lights are regularly reflected from the liquid crystal display device 20. Therefore, if the lights are made incident vertically on the liquid crystal display device 20, a high-contrast liquid crystal display is performed.

Figure 20:
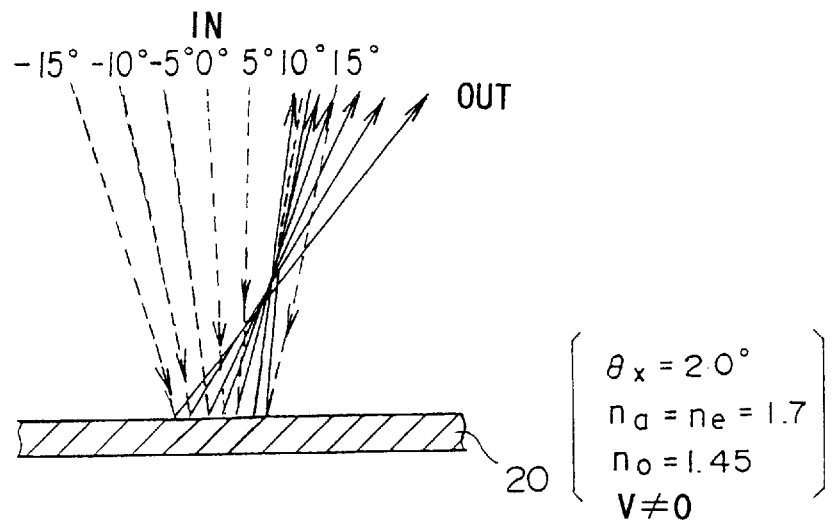
FIG. 20 is a diagram showing reflection of lights made incident at incident angles within a range of ±15° on the reflection liquid crystal display device.
Figure 21:
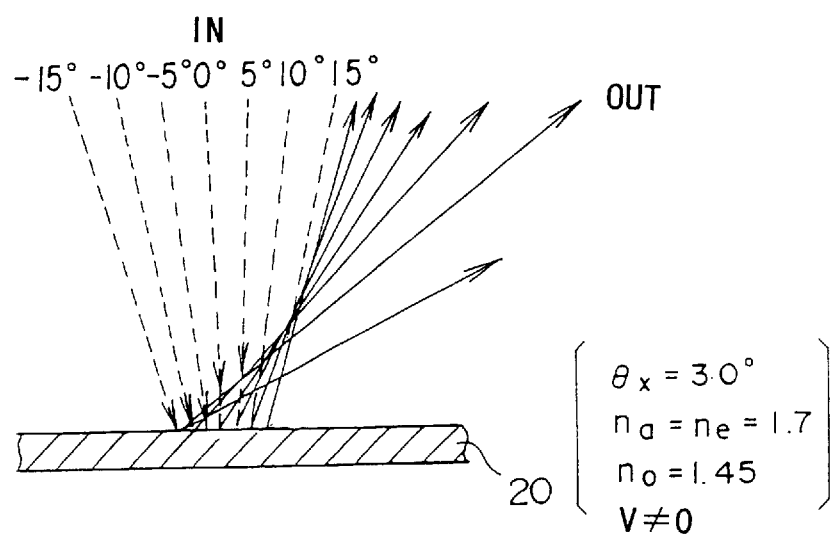
FIG. 21 is a diagram showing reflection of lights made incident at incident angles within a range of ±15° on the reflection liquid crystal display device.
Figure 22:
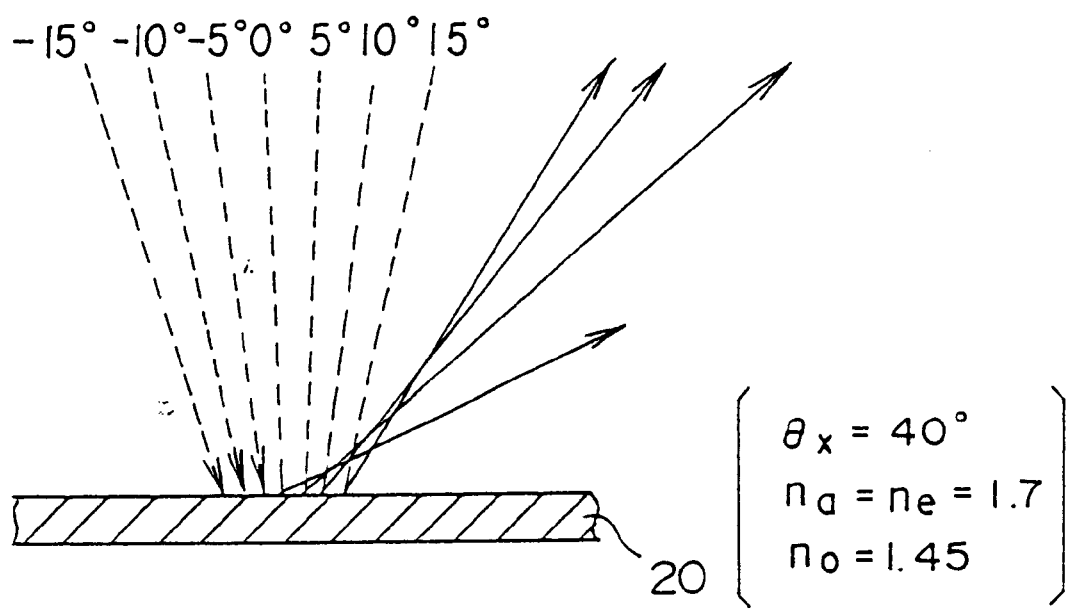
FIG. 22 is a diagram showing reflection of lights made incident at incident angles within a range of ±15° on the reflection liquid crystal display device.

Each of FIGS. 20 through 22 shows a reflected state of lights made incident at incident angles within the range of ±15° on the liquid crystal display device 20 in which $n_a=n_e=1.7$ and $n_o=1.45$. FIG. 20 is a diagram showing the reflected state of the incident lights in the liquid crystal display device 20 in which each of the interfaces 18a and 18b has an inclination θx satisfying θx=20° and a voltage is applied to the liquid crystal layer 14. FIG. 21 is a diagram showing the reflected state of the incident lights in the liquid crystal display device 20 in which θx=30° and a voltage is applied to the liquid crystal layer 14. FIG. 22 is a diagram showing the reflected state of the incident lights in the liquid crystal display device 20 in which θx=40° and a voltage is applied to the liquid crystal layer 14.

Generally, in a projection liquid crystal display device, lights are incident on a panel at incident angles within the range of approximately ±15°. Further, in a projection liquid crystal display device, the emission angles of emitted lights required for liquid crystal display also range within approximately ±15°. Therefore, if the principle of the present invention is applied to a projection liquid crystal display device so that θx is set, for instance, to 30° or greater, the emission angles of emitted lights have a range wider than the range of ±15° when a voltage is applied to the liquid crystal layer 14, thus allowing a high-quality black display to be performed.

In the case of applying the principle of the present invention to a direct vision liquid crystal display device, white display can be emphasized by disposing a front scattering plate on the outermost part of a panel.

[First Embodiment]

Figure 23:
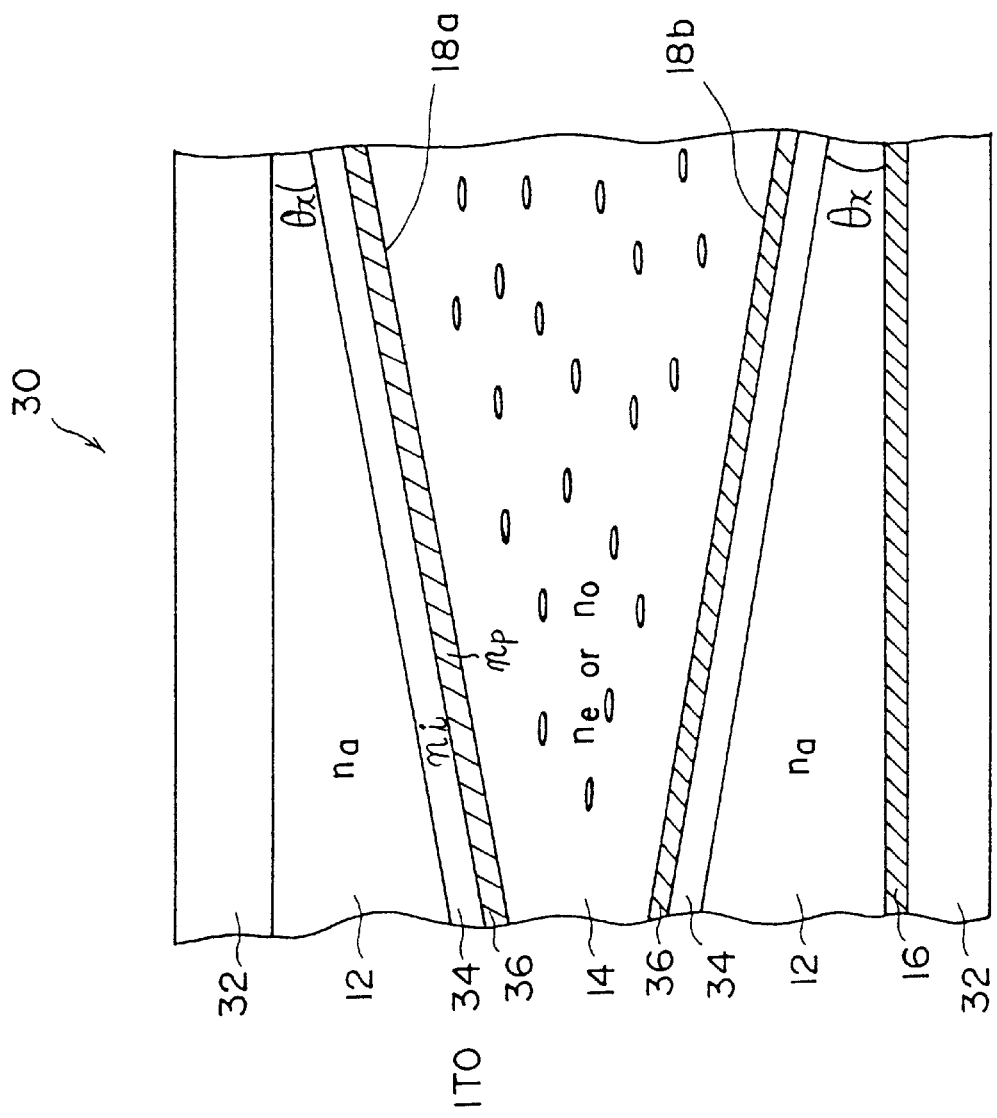
FIG. 23 is a sectional view showing a structure of a reflection liquid crystal display device according to a first embodiment of the present invention.

FIG. 23 is a sectional view showing a structure of a reflection liquid crystal display device 30 according to a first embodiment of the present invention.

In FIG. 23, the liquid crystal display device 30 includes between a pair of glass substrates 32 the liquid crystal layer 14, the reflector 16, two resin layers 12, two ITO (Indium Tin Oxide) electrodes 34, and two molecular alignment films 36. The molecular alignment films 36 are formed, for instance, of PI (PolyImide) films. In the structure of FIG. 23, the reflector 16 is formed on the lower glass substrate 32, and the lower resin layer 12 is formed on the reflector 16. The lower ITO electrode 34 is formed on the surface of the lower resin layer 12, and the lower molecular alignment film 36 is formed on the lower ITO electrode 34 so as to be in direct contact with the liquid crystal layer 14. Similarly, the upper resin layer 12 is formed on the upper glass substrate 32, and the upper ITO electrode 34 and the upper molecular alignment film 36 are formed on the upper resin layer 12 in the order described. The upper molecular alignment film 36 is in direct contact with the liquid crystal layer 14. In the above-described liquid crystal display device 30, the upper and lower resin layers 12 have slopes inclined at the same angle θx, and the above-described ITO electrodes 34 are formed on the slopes.

The terms "upper" and "lower" in the above description are intended simply for making clear the description of the structure of FIG. 23, and have nothing to do with the direction of gravity.

Here, letting the refractive indexes of each resin layer 12, the liquid crystal layer 14, each ITO electrode 34, and each molecular alignment film 36 be $n_a$, $n_e$, $n_i$, and $n_p$, respectively, and letting the refractive angles of an incident light in each resin layer 12, the liquid crystal layer 14, each ITO electrode 34, and each molecular alignment film 36 be $θ_a$, $θ_e$, $θ_i$, and $θ_p$, respectively, the following relations are established among the resin layers 12, the liquid crystal layer 14, the ITO electrodes 34, and the molecular alignment films 36:

$$n_a \sin θ_a = n_i \sin θ_i \quad (1)$$

$$n_i \sin θ_i = n_p \sin θ_p \quad (2)$$

$$n_p \sin θ_p = n_e \sin θ_e \quad (3)$$

From the above-described equations (1) through (3), $$n_a \sin θ_a = n_e \sin θ_e$$

is derived. Therefore, the emission angle of an emitted light is independent of the refractive indexes of the ITO electrodes 34 and the molecular alignment films 36, but is determined solely by the refractive index $n_a$ of each resin layer 12 and the refractive index $n_e$ ($n_o$) of the liquid crystal layer 14. Since the liquid crystal display device 30 includes the two interfaces 18a and 18b, the liquid crystal display device 30 has a greater angular difference between the directions of emitted and incident lights in the black-mode display than the liquid crystal display device 10 shown in FIG. 1. This allows the liquid crystal display device 30 to perform a higher-contrast display.

Further, since the liquid crystal display device 30 without a polarizer has a high reflectivity with respect to an incident light, the liquid crystal display device 30 can perform a high-brightness display. Furthermore, since the liquid crystal display device 30 employs no polarizer, the liquid crystal display device 30 can be downsized and lighter in weight, and the production costs thereof can be lowered.

[Second Embodiment]

Figure 24:
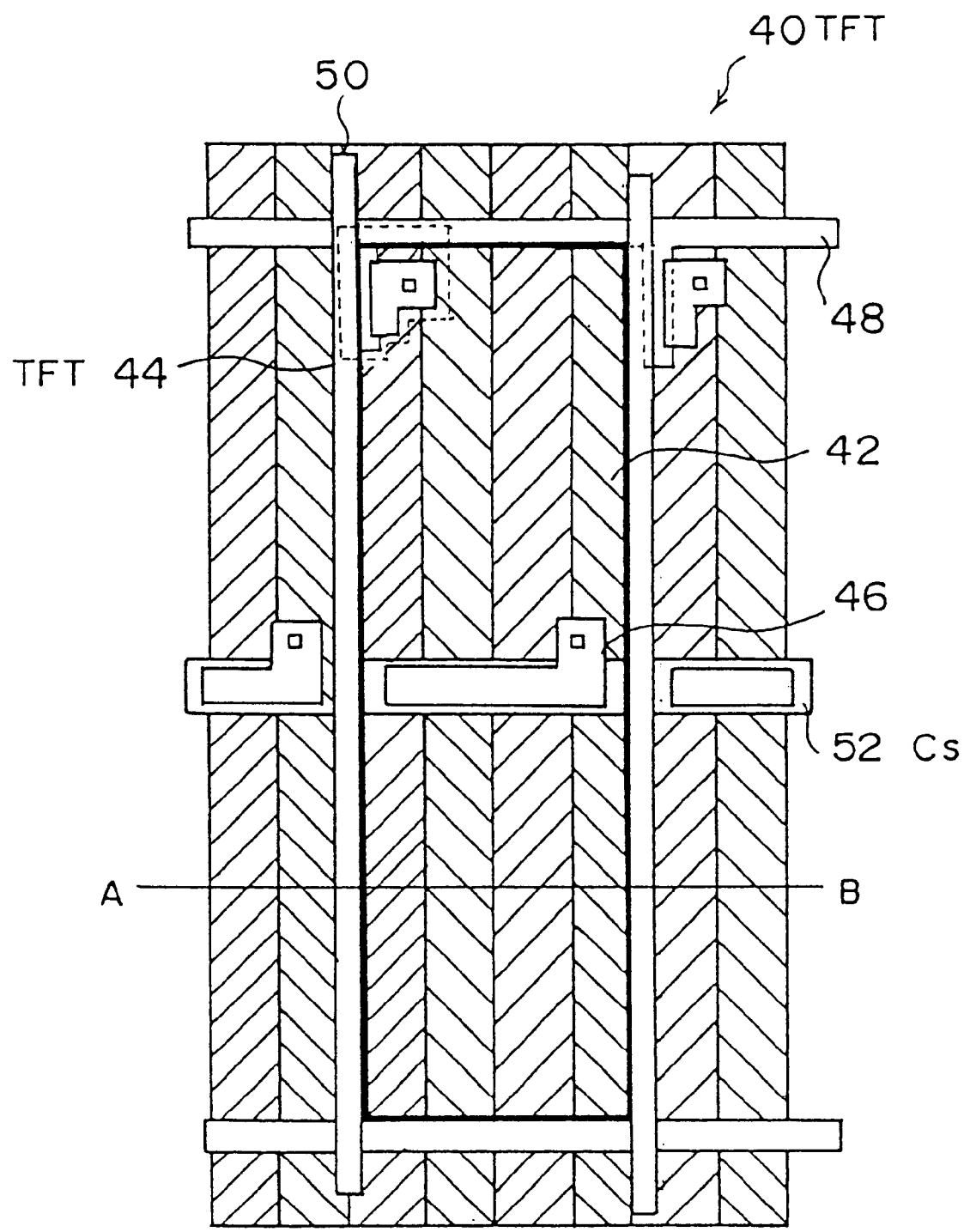
FIG. 24 is a diagram showing a structure of a reflection TFT panel according to a second embodiment of the present invention.
Figure 25:
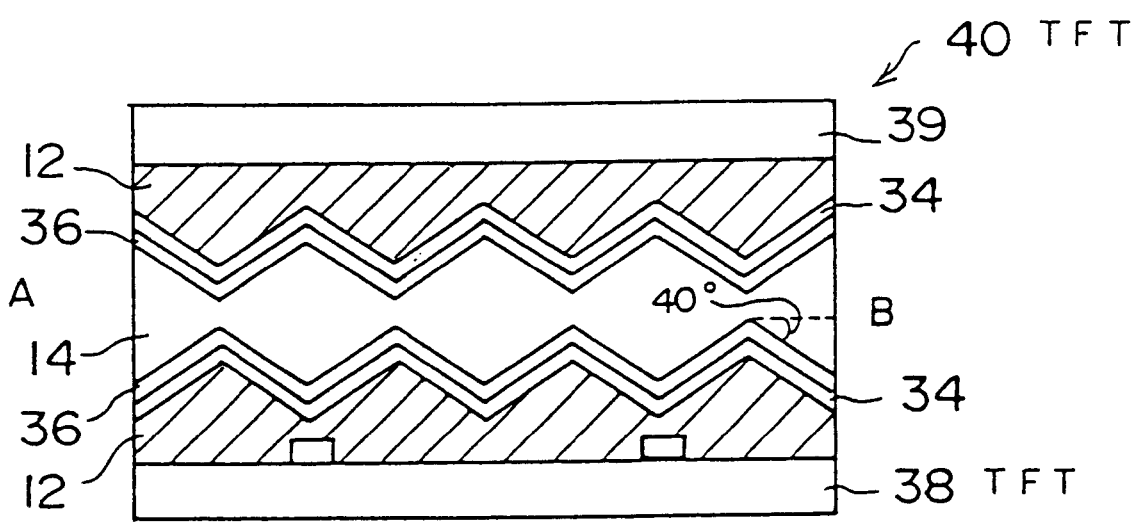
FIG. 25 is another diagram showing the structure of the reflection TFT panel according to the second embodiment of the present invention.

FIGS. 24 and 25 are diagrams showing a structure of a TFT panel 40 to which the principle of the present invention is applied according to a second embodiment of the present invention. FIG. 25 is a sectional view of the TFT panel 40 of FIG. 24 taken along the line A–B. The same elements as those of the liquid crystal display device 30 shown in FIG. 23 are referred to by the same numerals.

As shown in FIG. 24, one pixel ITO 42 includes a TFT (Thin Film Transistor) 44 and a storage capacity 46. The TFT 44 is connected to a gate line 48 and a data line 50. The storage capacity is provided on a Cs line 52. The resin layer 12 on the side of a TFT substrate 38 shown in FIG. 25 is formed under the pixel ITO 42 connected to the TFT 44, and functions as a final protection film and an insulating film to the pixel ITO 42. Further, the resin layer 12 on the side of the TFT substrate 38 has a contact hole formed therein for connecting the pixel ITO 42 and the source electrode of the TFT 44. In the case of forming the TFT panel 40 of a color reflection type, a color filter array is formed on the side of an opposing substrate 39. At this point, the resin layer 12 on the side of the opposing substrate functions as a topcoat. Further, by providing a microlens array having the same pitch as each slant part of the resin layers 12 on the opposing substrate 39, light can be gathered through the microlens array as well as an opening, thus realizing a brighter liquid crystal display. By refracting incident lights at an angle close to 90° or refracting incident lights so that the incident lights focus, black representation of liquid crystal display by way of refraction can be performed more effectively. Moreover, the microlens array prevents lights incident on a slant part from being made incident on adjacent slant parts, which enhances the contrast of liquid crystal display.

[Third Embodiment]

Figure 26:
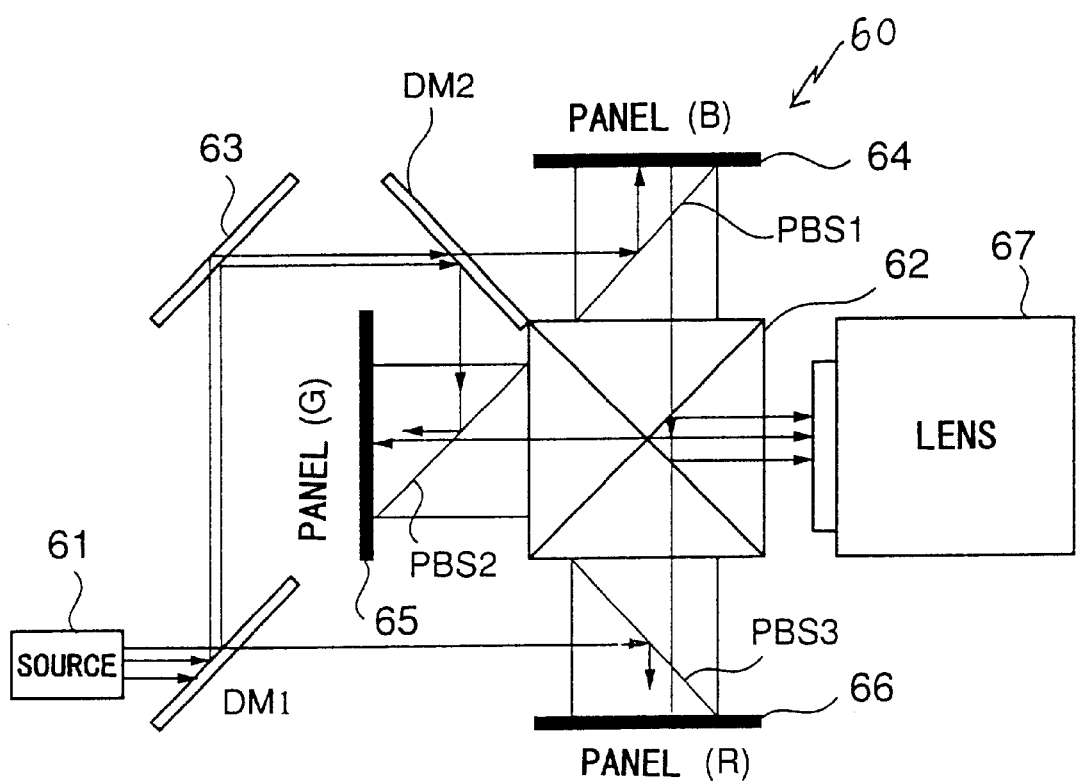
FIG. 26 is a diagram showing a structure of a projection liquid crystal display device according to a third embodiment of the present invention.

FIG. 26 is a diagram showing a structure of a projection liquid crystal display device 60 including liquid crystal panels 64, 65, and 66 to which the principle of the present invention is applied according to a third embodiment of the present invention.

As shown in FIG. 26, the projection liquid crystal display device 60 includes a light source 61, a dichroic mirrors DM1 and DM2, a cross dichroic prism 62, beam splitters PBS1, PBS2, and PBS3, a total reflection mirror 63, the blue liquid crystal panel 64, the green liquid crystal panel 65, the red liquid crystal panel 66, and a projection lens 67. Each of the blue, green, and red liquid crystal panels 64, 65, and 66, to which the principle of the present invention is applied, employs no polarizer. This enables the projection liquid crystal display device 60 to perform a high-contrast and high-brightness display. Further, since each of the blue, green, and red liquid crystal panels 64, 65, and 66 employs no polarizer, the projection liquid crystal display device 60 can be downsized and be produced at low costs.

Moreover, since the projection liquid crystal display device 60 of this embodiment employs no polarizer, the projection liquid crystal display device 60 is free of the problem of polarizer degradation caused by increasing temperature. Therefore, a high-brightness projected image can be obtained without using a complicated device for cooling a polarizer.

[Fourth Embodiment]

Next, a description will be given of a method of forming the slant parts of each resin layer 12 included in the liquid crystal display device 30 shown in FIG. 23.

FIGS. 27 through 30 are diagrams for illustrating the method of forming the slant parts of each resin layer 12 included in the liquid crystal display device 30.

Figure 27:
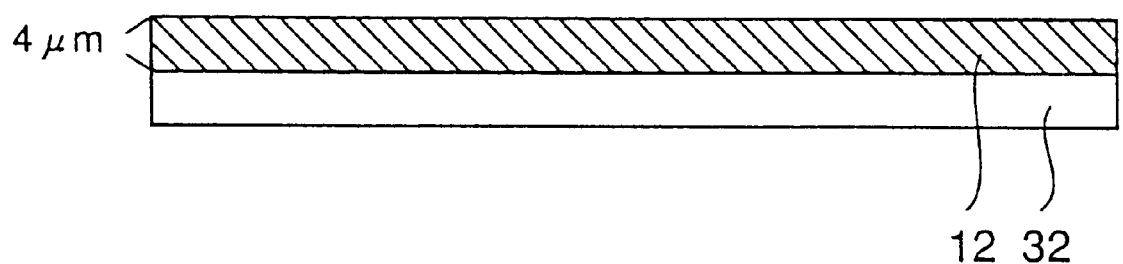
FIGS. 27 through 30 are diagrams showing a method of producing a reflection liquid crystal display device according to a fourth embodiment of the present invention.

In order to form the slant parts of the resin layer 12, first, the resin layer 12 of a predetermined thickness (for instance, approximately 4 μm) is formed by spin coating on the glass substrate 32 shown in FIG. 23 (FIG. 27). An acrylic resin having planarization capability and photosensitivity (for instance, PC-335 made by JALS) is used for the resin layer 12.

Figure 28:
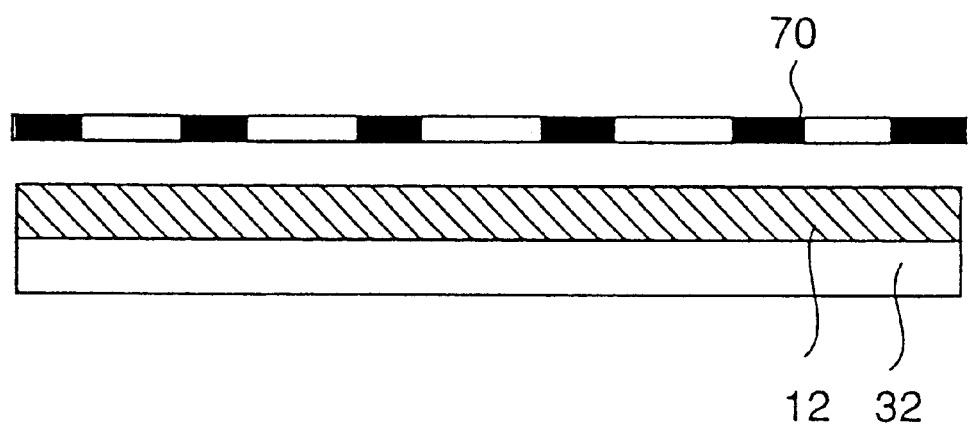
Figure 29:
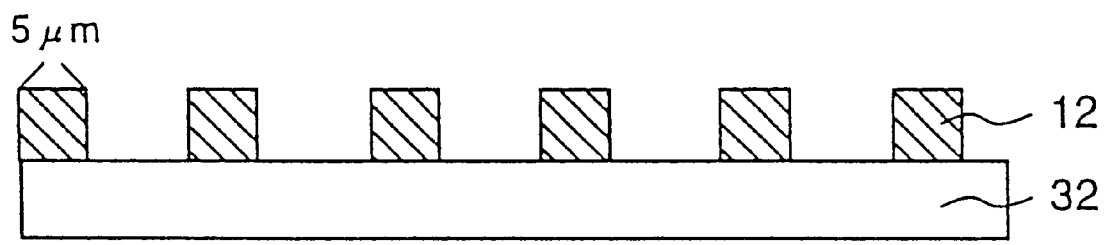

Next, the resin layer 12 is exposed to UV light through a photomask 70 (FIG. 28). Then, development is performed, for instance, by using TMAH (FIG. 29). At this point, the resin layer 12 has a pattern pitch of, for instance, approximately 5 μm.

Figure 30:
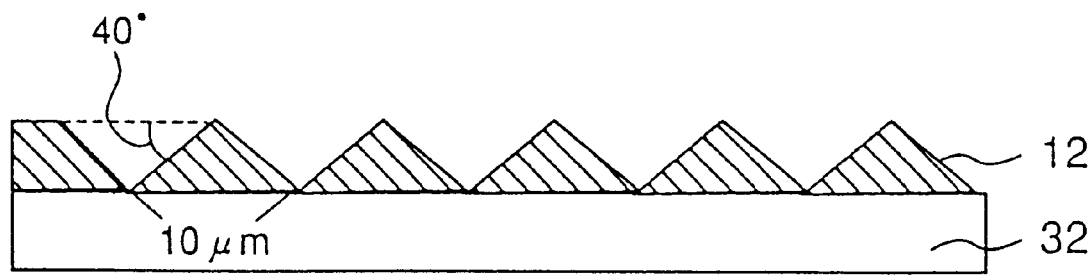

Next, the resin layer 12 is subjected to reflow at a predetermined temperature (for instance, within the range of approximately 135° to 200° (FIG. 30). As a result, the pattern of the resin layer 12 is melt so that the slant parts each having a predetermined pitch and a predetermined inclination (for instance, a pitch of 10 μm and an inclination of 40°) are formed with good accuracy. By bonding together the two substrates formed in the above-described process, a panel having minute slant parts can be obtained with ease.

As described above with reference to FIGS. 12 through 19 and FIGS. 20 through 22, the high-contrast switchable TFT panel 40 can be obtained by using the resin layers 12 each having a refractive index $n_a$ within the range of 1.5 to 1.7 and the liquid crystal layer 14 having a refractive index $n_o$ for ordinary ray up to 1.7 and a refractive index $n_e$ for extraordinary ray up to 1.5 (for instance, ZLI-4803 or ZLI-4850 made by Merck) and by providing each resin layer 12 with an inclination within the range of 30° to 40°.

Preferred embodiments of the present invention have been described above. However, the present invention is not limited to the specifically disclosed embodiments, but variations and modifications may be made without departing from the scope of the present invention.

Industrial Applicability

According to the present invention, if the refractive index of the transparent insulating layer is substantially equal to that of the liquid crystal layer, a light incident on the reflection liquid crystal display device along an incident optical path vertical thereto is emitted out to travel in the reverse direction in an emission optical path substantially equal to the incident optical path. On the other hand, if the refractive index of the transparent insulating layer is not equal to that of the liquid crystal layer, a light incident on the reflection liquid crystal display device along an incident optical path vertical thereto is emitted out along an emission optical path different from the incident optical path. Therefore, unlike a conventional liquid crystal display device, the reflection liquid crystal display device of the present invention is allowed to optically modulate an incident light without using a polarizer, and accordingly, to perform a high-brightness display of a high contrast ratio.

Further, since the reflection liquid crystal display device of the present invention has high brightness, the reflection liquid crystal display device can be used also as a projection liquid crystal display device. In this case, since the reflection liquid crystal display device employs no polarizer, there is no need for polarizer cooling even in the case of using a strong high-brightness light source as a light source, thus resulting in a simplified structure of the projection liquid crystal display device.

What is claimed is:

1. A reflection liquid crystal display device comprising:
    a liquid crystal layer;
    a first transparent insulating layer provided between said liquid crystal layer and a first substrate in an optical path of a light incident on said liquid crystal layer through said first substrate, the first transparent insulating layer having a refractive index substantially equal to one of refractive indexes for ordinary ray and for extraordinary ray of said liquid crystal layer;
    a second transparent insulating layer provided in said optical path of said light passed through said liquid crystal layer between said liquid crystal layer and a second substrate, said second transparent insulating layer having a refractive index substantially equal to one of the refractive indexes for ordinary ray and for extraordinary ray of said liquid crystal layer; and a reflector provided between said second transparent insulating layer and said second substrate for reflecting the light passed through said second transparent insulating layer;

wherein said first transparent insulating layer forms a first interface to said liquid crystal layer such that said first interface includes a plurality of first slant parts of substantially the same shape, and said second transparent insulating layer forms a second interface to said liquid crystal layer such that said second interface includes a plurality of slanted parts, each of said first slanted parts forming a slope opposite to a slope formed by a corresponding second slanted part.

2. The reflection liquid crystal display device as claimed in claim 1, wherein the refractive index of said first transparent insulating layer and said second transparent insulating layer is equal to the refractive index for extraordinary ray of said liquid crystal layer and lies in a range of 1.5 to 1.7.

3. The reflection liquid crystal display device as claimed in claim 1, wherein the refractive index of said first transparent insulating layer and said second transparent insulating layer is equal to the refractive index for ordinary ray of said liquid crystal layer and lies in a range of 1.4 to 1.5.

4. The reflection liquid crystal display device as claimed in claim 1, wherein each of said first and second slant parts forms an inclination angle in a range of 10° to 40°.

5. The reflection liquid crystal display device as claimed in claim 1, wherein said first and second slant parts are formed by subjecting a thermoplastic transparent resin layer patterned by exposure to reflow at a predetermined temperature.

6. The reflection liquid crystal display device as claimed in claim 1, wherein:

said first and second transparent insulating layers are formed in symmetry with each other.

7. The reflection liquid crystal display device as claimed in claim 1, further including a front scattering plate provided outside said first substrate.

8. The reflection liquid crystal display device as claimed in claim 1, wherein said first substrate supports a microlens array thereon, the microlens array having a pitch identical to a pitch of the first slant parts.

9. A projection liquid crystal display device comprising:

a reflection liquid crystal display device; and a projection lens provided in an optical path of a light emitted from said reflection liquid crystal display device, wherein:

said reflection liquid crystal display device comprises:

a liquid crystal layer;

a first transparent insulating layer provided between said liquid crystal layer and a first substrate, the first transparent insulating layer having a refractive index substantially equal to one of refractive indexes for ordinary ray and for extraordinary ray of said liquid crystal layer;

a second transparent insulating layer provided between said liquid crystal layer and a second substrate at a side away from said first transparent insulating layer, the second transparent insulating layer having a refractive index substantially equal to one of refractive indexes for ordinary ray and for extraordinary ray of said liquid crystal layer;

a reflector provided between said second transparent insulating layer and said second substrate for reflecting the light passed through said second transparent insulating layer;

a first interface formed between said liquid crystal layer and said first transparent insulating layer having a plurality of first slant parts of substantially the same shape; and a second interface formed between said liquid crystal layer and said second transparent insulating layer having a plurality of second slant parts of substantially the same shape;

wherein each of said first slanted parts forms a slope opposite to a slope formed by a corresponding second slanted part.

* * * * *